Feb. 5, 1924.  1,482,707
F. W. SKINNER
MACHINE FOR AND PROCESS OF MAKING HOLLOW RUBBER ARTICLES
Filed Dec. 12, 1921    3 Sheets-Sheet 3
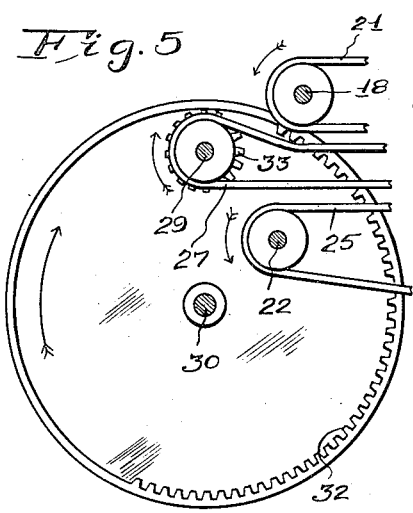
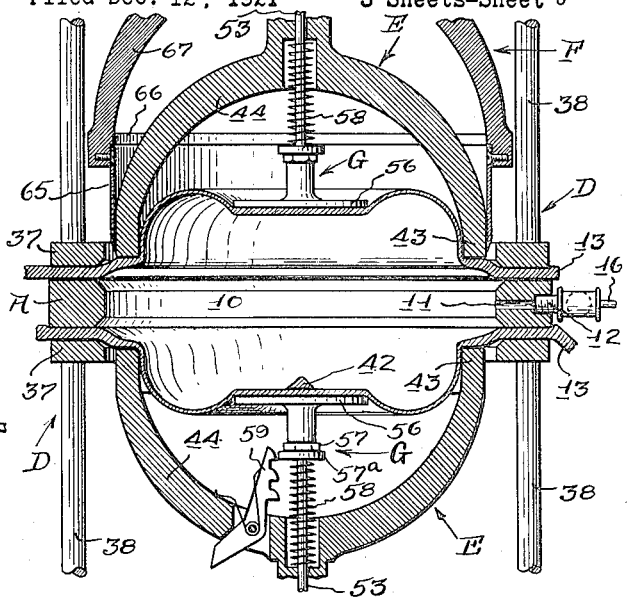
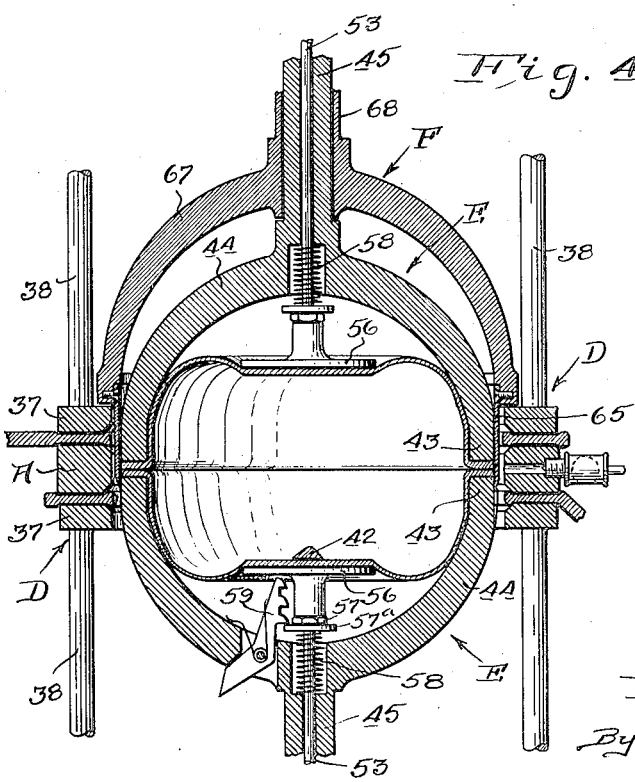
Inventor
Frank W. Skinner
By Bradbury & Caswell
Attorneys Patented Feb. 5, 1924.

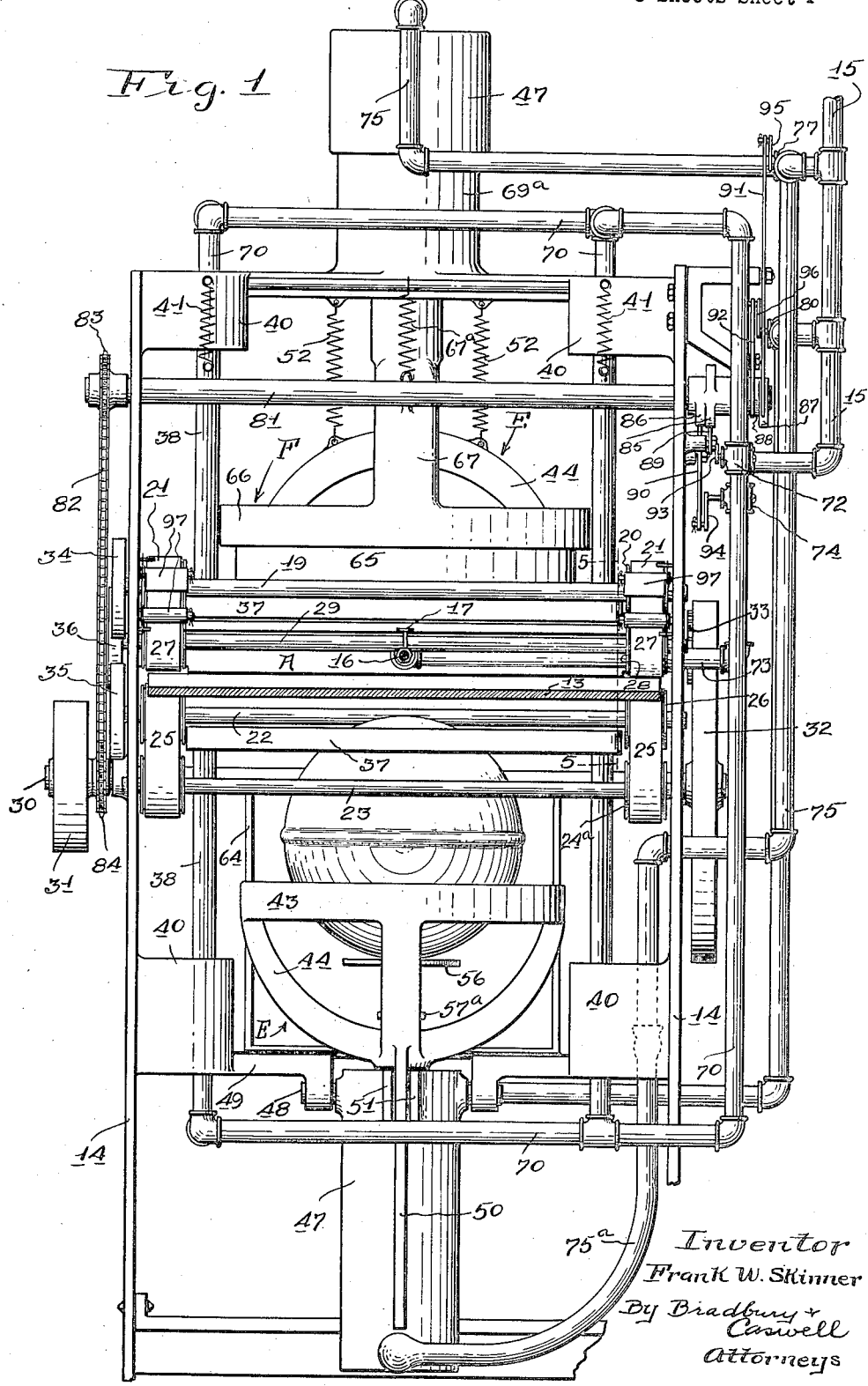

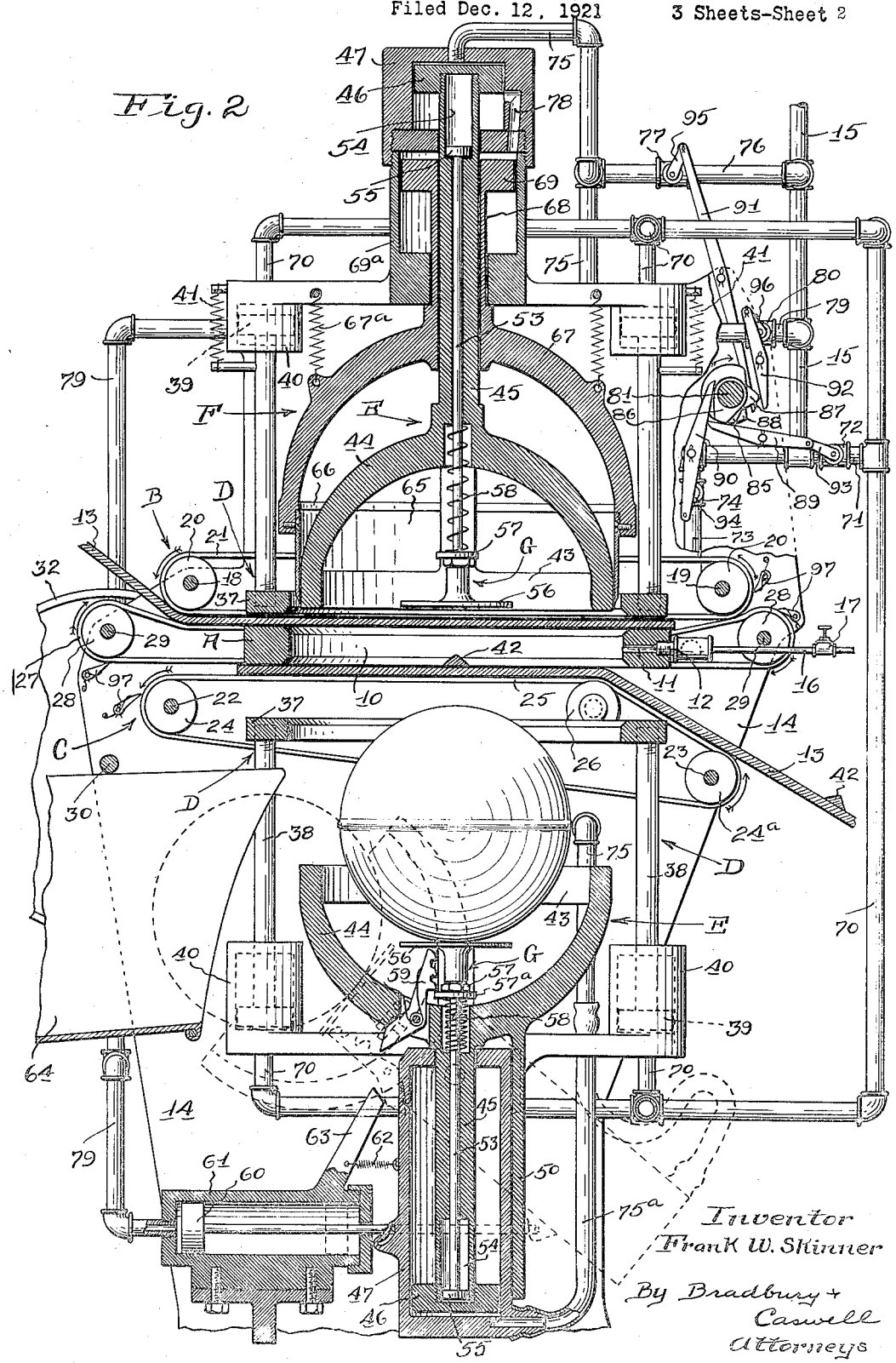

1,482,707

UNITED STATES PATENT OFFICE.

FRANK W. SKINNER, OF MINNEAPOLIS, MINNESOTA.

MACHINE FOR AND PROCESS OF MAKING HOLLOW RUBBER ARTICLES.

Application filed December 12, 1921. Serial No. 521,617.

*To all whom it may concern:*

Be it known that I, FRANK W. SKINNER, a citizen of the United States, residing at Minneapolis, in the county of Hennepin and State of Minnesota, have invented a new and useful Machine for and Process of Making Hollow Rubber Articles, of which the following is a specification.

My invention relates to an improved machine for and process of making hollow rubber articles, such as playing balls, pneumatic tires and various other rubber products which contain internal fluid pressure, either permanently or temporarily.

Broadly, it is my object to provide for increasing the output and limiting the expense in the production of hollow rubber articles by providing a rapidly operating machine, rubber stock therefor being fed thereto in the form of continuous sheets, the working parts of said machine being simple in construction and co-operating to form hollow objects, the walls of which assume substantially uniform thickness, when discharged from the machine.

A further object is to provide a device for forming hollow objects including means for trapping an inflating medium between opposed portions of sheet rubber stock, devices to unite and form a seam between companion members formed by the inflated stock, and a shearing device to sever the inflated body from the rubber sheets.

Another object is to provide a device for simultaneously forming companion members of opposed convexity by interposing between and inflating the same from sheet rubber stock and yieldingly supporting the central regions of the expanding stock during the inflating process to prevent stretching of the stock in said central regions.

With the foregoing and other objects in view, which will appear in the following description, the invention resides in the novel combination and arrangement of parts and in the details of construction hereinafter described and claimed.

In the drawings, Fig. 1 is an end view of a machine embodying my invention; Fig. 2 is a vertical, central, sectional view thereof; Fig. 3 is a detail sectional view taken through the center of the spacer plate and illustrates that step in the formation of a hollow rubber article, wherein the expanding medium is introduced between opposed portions of sheet rubber stock; Fig. 4 is a view similar to Fig. 3, showing a hollow rubber body formed from two sheets of rubber stock and severed from said sheets; Fig. 5 is a detail sectional view taken on the line 5—5 of Fig. 1, and illustrates particularly a part of the driving mechanism for the sheet moving conveyors.

Reference being had to the drawings, it will be noted that I have used like numerals and letters of reference to indicate like parts throughout the several views. A is a horizontal spacer plate having an opening 10 therein, said opening communicating through a duct 11, in said plate, with an injector nozzle 12 fitted therein. Conveyors B and C on opposite sides of the spacer plate A are provided to carry sheets of rubber into positions covering the opening 10 in the spacer plate A. Opposed clamps D operate to grip endless zones of rubber sheets 13 against the spacer plate A, about the opening 10 therein. Sealing members E operate to join, in an endless seam, inflated portions of the rubber sheets confined within the clamps D. A shearing device F serves to sever an inflated body from the sheet rubber stock.

The spacer plate A is supported horizontally by upright frame members 14. The injector nozzle 12 communicates with a compressed air main 15 and also with a liquid gas conduit 16 having a valve 17 therein.

The conveyor B includes transverse shafts 18 and 19 journaled in the frame members 14. Pulleys 20, near the ends of said shafts, carry belts 21 in spaced relation, the lower reaches of said belts traveling in a plane slightly above the upper surface of the spacer plate A. The conveyor C includes transverse shafts 22 and 23 journaled in the frame members 14. Pulleys 24 and 24ª near the ends of said shafts carry belts 25 in spaced relation. Idler pulleys 26 journaled upon the frame members 14 engage beneath the upper reaches of said belts 25 and, together with the pulleys 24, direct the greater portions of the upper reaches of said belts 25 in a plane slightly beneath the spacer plate A. Those portions of the upper reaches of the belts 25, between the idler pulleys 26 and the pulleys 24ª are inclined downward (Fig. 2) for purposes, as will hereinafter appear. A third set of belts 27 is carried upon spaced pulleys 28 mounted upon shafts 29 journaled in the frame members 14. The upper reaches of these belts 27, co-operating with the lower reaches of the belts 21, complete the conveyor B, while the lower reaches of said belts 27, co-operating with the upper reaches of the belts 25 complete the conveyor C. A power shaft 30, journaled transversely in the frame members 14, has a drive pulley 31 fixed on one end thereof and an internal, mutilated gear 32 (Figs. 1 and 5) at its other end. Said internal gear 32 meshes intermittently with a gear 33 on the shaft 29 and rotates said shaft through said gear 33. Rotation of the shaft 29 is imparted to the shafts 18 and 22 through driven friction wheels 34 and 35 thereon, the same engaging a driving friction wheel 36 on the shaft 29. Rotation of the internal gear 32, through its operative half-cycle, propels the belts 21, 25 and 27 a sufficient distance to feed rubber sheets 13, gripped at their margins by the co-operating reaches of said belts, into positions covering the opening 10, above and beneath the spacer plate A (Fig. 2).

The clamps D include gripping rings 37 carried by piston rods 38, the heads 39 of said piston rods being slidable in cylinders 40. The upper clamp D is arranged so that the ring 37, when depressed, will clamp the upper rubber sheet 13 against the upper margin of the opening 10 in the spacer plate A, springs 41 being employed to lift the clamp D into inoperative position. The lower clamp D, when elevated, presses the lower rubber sheet 13 against the lower margin of the opening 10 in the spacer plate A. Gravity retracts the lower clamp D, said clamp being arranged so that the ring 37 may be depressed a sufficient distance to permit the lower rubber sheet to fall upon the reaches of the belts 25, between the idler pulleys 26 and the pulleys 24ª on the shaft 23. This provision for lowering said rubber sheet allows the free entrance of plasters 42, into the opening 10. These plasters comprise pieces of uncurable rubber, the same being placed, at intervals upon the lower rubber sheet, and providing self sealing patches for finished articles, through which fluid injecting instruments may be inserted.

The upper sealing member E comprises a sealing ring 43 carried by arms 44 on a stem 45, said stem being fitted with a piston head 46 slidable in a cylinder 47. The lower sealing member E is similar to the upper sealing member, the corresponding parts being similarly numbered. The cylinder 47 associated with the lower sealing member E is pivoted on trunnions 48 (Fig. 1) journaled in brackets 49 on the frame members 14. A depending guide 50 on one of the arms 44 slides between lugs 51 on the tiltable cylinder 47 and operates to prevent rotation of the lower sealing member E. The upper sealing member E is withdrawn from the spacer plate A by means of springs 52, while the lower sealing member E is retracted by gravity. Both sealing members E are designed to be thrust into position, causing the rings 43 to grip opposite sides of the rubber sheets 13, within the opening 10 in the spacer plate A (Fig. 4).

Yielding abutments G are carried by the sealing members E. Each abutment includes a shank 53, slidable axially in the stem 45 of its respective sealing member E. Each stem 45 has a bore 54 therein to slidably receive a stop 55 on its respective shank 53, said stop being designed to coact with the inner ends of the bores 54 to limit the inward thrusts of said shanks 53. Contact plates 56, having knurled or otherwise roughened contacting surfaces, are fixed to the inner ends of the shanks 53. A nut 57, formed with a flange 57ª, is threaded on each shank 53. Between each nut 57 and the stem 45 of its respective sealing member E is a spring 58, coiled about the shank 53. These springs operate to yieldingly hold the contact plates 56 inwardly (see upper plate, Fig. 1), but give under the pressure of an object, during the inflation thereof (Fig. 3). Said knurled plates 56 reduce stretching of rubber stock pressed thereagainst, thus retaining a greater thickness of material in regions which might be unduly stretched during the inflating process. The lower abutment G is latched in depressed relation by means of a spring pressed pawl 59 mounted on one of the arms 44 of the lower sealing member E. Said abutment forms a rest for a completed article (Fig. 2) and the arms 44 together with the sealing ring 43 of the lower sealing member E, supply a cage in which a completed article is carried, when the lower sealing member E is lowered. As before stated, the cylinder 47, carrying the lower sealing member E, is pivotally supported. A piston 60, in a cylinder 61, operates to tilt the sealing member E (dotted lines Fig. 2), a spring 62 yieldingly operating to erect said cylinder 47. A trip 63 on the cylinder 61 engages the pawl 59, causing it to free the yielding abutment G, when the lower sealing member E has reached the tilted position shown in dotted lines, Fig. 2. The freeing of said abutment G results in a quick ejecting thrust thereof, which throws a formed article from the lower sealing member E into a chute 64 arranged to receive and direct it from the machine.

The shearing device F includes an annular blade 65, depending from a ring 66, carried by arms 67, on a sleeve 68, said sleeve being telescoped over the stem 45 of the upper sealing member E. The upper end of the sleeve 68 terminates in a piston head 69, fitted within a cylinder 69ª.

During one rotation of the power shaft 30, rubber sheets 13 are moved by the conveyors B and C into positions covering the opposite sides of the opening 10 in the spacer plate A (Fig. 1); the clamping rings 37 are brought to bear upon the sheets (Fig. 3), clamping endless zones thereof against the spacer plate A; a predetermined volume of air is introduced through the injector 12 between the confined portions of the rubber sheets (Fig. 3); the sealing members E join endless zones of the inflated portions of the rubber sheets, forming a seam between them (Fig. 4); the annular shearing blade 65 is depressed to sever the inflated body from the rubber sheets (Fig. 4); the lower sealing member E, carrying the formed article, falls by gravity and is tilted by the piston 60 (dotted lines Fig. 2), the tilting of said sealing member resulting in the ejection of the formed article.

The cylinders 40 receiving the pistons 39 of the clamps D, communicate through branch conduits 70 and a conduit 71 (Fig. 2) with the air main 15, a valve 72 being fitted in the conduit 71 and formed to open the conduits 70 to the outer air, when said valve is closed. Opening the valve 72 results in thrusting the clamping rings 37 against the plate A and the closing of said valve 72 permits the lower clamp to recede by gravity and also results in permitting the springs 41 to lift the upper clamp (Fig. 2). The nozzle 12 communicates through a conduit 73 with the air main 15, said conduit being fitted with an ordinary cut-off valve 74. The cylinders 47 for operating the sealing members E communicate through branch conduits 75 and a conduit 76 with the air main 15, a valve 77, similar to the valve 72, being fitted in the conduit 76. The opening of this valve 77 causes the sealing action of the sealing members E (Fig. 4), while the closing thereof permits the retraction of the lower member E by gravity and of the upper member E by the action of the springs 52 (Fig. 1). A section 75ª of the conduit 75 leading to the cylinder 47 is flexible to permit the tilting of said cylinder. The cylinder 69ª receives its operating charge of air, through the port 78, following the sealing thrust of the upper sealing member E, said port 78 being uncovered by the piston 46, when said sealing member E has become fully depressed. The working thrust of the piston 69 within the cylinder 69ª results in depressing the shearing device F against the action of the retracting springs 67ª and causes the blade 65, which co-operates with the rings 43 of the sealing members E, to sever those portions of the rubber sheets gripped within said rings 43. The cylinder 61 communicates through a conduit 79 with the air main 15, said conduit being fitted with a valve 80 similar to the valves 72 and 77. The valves 72, 74, 77 and 80 are operated, in the order named, by the following mechanism: A cam shaft 81, journaled transversely in the frame members 14, is driven through a sprocket chain 82 passing over a sprocket wheel 83 on the cam shaft 81 and a sprocket wheel 84 on the power shaft 30. Said cam shaft 81 is supplied with cams 85, 86, 87 and 88, which are respectively engaged by pivoted cam levers 89, 90, 91 and 92. The cam lever 89 is connected with the actuating lever 93 of the valve 72; the cam lever 90 with the lever 94 of the valve 74; the cam lever 91 with the lever 95 of the valve 77 and the cam lever 92 with the lever 96 of the valve 80. The cams 85, 86, 87 and 88 are designed to cause the relative operations of the clamp D, injector 12, sealing members E, and shearing device F, as above described.

I have shown a hand operated valve 17 for admitting liquid gas into the injector 12, but it will be understood, that said valve may be operated automatically like the valves 72, 74, 77 and 80 or otherwise suitably controlled.

The conveyors B and C are equipped with strippers 97 to free the unused stock therefrom. This stock is recalendered for future use.

As the hollow articles are delivered from the machine, they are subjected to heat, in the usual manner, in ordinary vulcanizing or curing molds. In the curing process, the gas forming liquid within the articles is transformed into a gas, which causes additional internal pressure sufficient to press the walls of the articles against the walls of the vulcanizing mold. Being substantially inflated by the expanding medium, in the course of formation, only a limited amount of gas forming matter is required. As heretofore explained, the central regions of each member of an article is saved against stretching by the yielding abutments G. The walls of an article at these central regions, and at the circumferential zone at the seam between the two united members, are thicker than the walls at the intermediate zones. Beginning with the interruption of contact between an article and the abutments G and ending with the curing process in a vulcanizing mold, the surplus material at the axial regions and at the seam, is automatically merged into the initially thinner wall portions from opposite sides thereof, thus finally resulting in an article having a wall of substantially uniform thickness. In machines for forming small articles, I dispense with the abutments G, since the stretching of the material at the axial regions thereof is limited and practically compensated for in the absorption of material from the seams.

It will be appreciated by those skilled in the art of producing hollow rubber articles that I dispense with the usual heavy and expensive forming molds; that by inflating the companion members of an article by means of an expanding medium introduced directly between them, I provide for speed in operation and uniformity in structure; that the introduction of a gas forming liquid with the inflating medium saves an operation and provides for a more efficient action in the curing process and that the control maintained over the stretching of rubber stock during the inflating process, simply and effectively provides for the production of articles with walls of uniform thickness.

While I have illustrated only one article forming unit, it will be understood that a plurality of such units may be employed in a single machine. In other words, I contemplate the use of a number of article forming units fed in common from two sheets of rubber stock. This change and others in the specific form and method of my invention, as herein disclosed, may be made within the scope of what is claimed without departing from the spirit of my invention.

Having described my invention, what I claim as new and desire to protect by Letters Patent is:

1. The process of making hollow rubber articles, which consists in clamping sheets of rubber in endless zones against opposite sides of a spacer frame and about an opening therein, simultaneously inflating those portions of the rubber stock within said zones by means of a fluid medium, joining adjacent endless zones of the inflated stock, within the opening in the spacer frame, and severing the inflated body thus formed from the sheets of rubber.

2. The process of making hollow rubber articles, which consists in simultaneously inflating companion members by introducing a fluid medium between portions of rubber sheets, joining endless zones of the inflated members and severing from the sheets of rubber the inflated body thus formed.

3. The process of making hollow rubber articles, which consists in clamping portions of sheets of rubber at their margins against a spacer element and in position covering opposite sides of an opening therein, simultaneously inflating said portions of the rubber sheets with a fluid medium introduced into the opening in the spacer element, supporting certain sections of said portions against stretching following initial inflation, joining endless zones of the inflated portions and severing the inflated body thus formed from the sheets of rubber.

4. The process of making hollow rubber articles, which consists in simultaneously inflating companion members by introducing a fluid medium between portions of rubber sheets, continuously supporting central sections of said members against stretching during the inflation thereof, joining endless zones of the inflated members and severing from the sheets of rubber the inflated body thus formed.

5. The process of making hollow rubber articles, which consists in clamping sheets of rubber in endless zones against opposite sides of a spacer frame and about an opening therein, introducing a fluid medium into said opening, also a gas forming liquid, the former serving to expand those portions of the rubber stock within said zones, joining the inflated stock within the opening to form a seam between the two expanded portions of rubber stock, severing the inflated body thus formed and subjecting the body to heat, within a mold, to cure the body and convert into gas, the gas forming fluid therein.

6. The process of making hollow rubber articles, which consists in clamping sheets of rubber in endless zones against opposite sides of a spacer frame and about an opening therein, simultaneously introducing a fluid medium and a gas forming liquid, through a common inlet, into said opening, the former serving to expand those portions of the rubber stock within said zones, joining the inflated stock within the opening to form a seam between the two expanded portions of rubber stock, severing the inflated body thus formed and subjecting the body to heat, within a mold, to cure the body and convert into gas, the gas forming fluid therein.

7. In a device of the class described, a spacer plate having an opening therein, means for clamping endless zones of sheet rubber stock against opposite sides of the spacer plate, about said opening, means for introducing an expanding medium into said opening to inflate the confined portions of the rubber stock and opposed sealing members movable into operative relation, within said opening, to join the inflated portions of rubber stock in endless zones.

8. In a device of the class described, a spacer plate having an opening therein, means for clamping endless zones of sheet rubber stock against opposite sides of the spacer plate, about said opening, means for introducing an expanding medium into said opening to inflate the confined portions of the rubber stock, yielding abutments arranged to be engaged by central regions of the confined portions of rubber stock and adapted to reduce stretching of said regions during the inflating process, and opposed sealing members movable into operative relation, within said opening, to join the inflated portions of rubber stock in endless zones.

9. In a device of the class described, a spacer plate having an opening therein, means for clamping endless zones of sheet rubber stock against opposite sides of the spacer plate, about said opening, means for introducing an expanding medium into said opening to inflate the confined portions of the rubber stock and opposed sealing members movable into operative relation, within said opening, to join the inflated portions of rubber stock in endless zones, yielding abutments, carried by said sealing members, arranged to be engaged by central regions of the confined portions of rubber stock and adapted to reduce stretching of said regions during the inflating process.

10. In a device of the class described, a plate, means for clamping an endless zone of sheet rubber stock against the plate, means for introducing an expanding medium between the plate and the confined portion of the rubber stock to inflate the latter, and means for sealing the inflated portion of rubber stock to retain the expanding medium therein.

11. In a device of the class described, a plate, means for clamping an endless zone of said rubber stock against the plate, means for introducing an expanding medium between the plate and the confined portion of the rubber stock to inflate the latter, a yielding abutment arranged to be engaged by a given region of said confined portion of rubber stock, and means for sealing the inflated portion of rubber stock to retain the expanding medium therein.

12. In a device of the class described, a spacer plate having an opening therein, means for clamping endless zones of sheet rubber stock against opposite sides of the spacer plate, about said opening, an injector communicating with said opening for simultaneously supplying thereto an expanding medium and a gas forming liquid, the former serving to atomize the latter and also to inflate the confined portions of the rubber stock, and opposed sealing members movable into operative relation, within said opening, to join the inflated portions of rubber stock in endless zones.

13. In a device of the class described, a spacer plate having an opening therein, conveyors on either side of the spacer plate adapted to carry sheets of rubber into positions overlapping said opening, means for clamping endless zones in the rubber stock, against opposite sides of the spacer plate, about said opening, an injector communicating with said opening for simultaneously supplying thereto an expanding medium and a gas forming liquid, the former serving to atomize the latter and also to inflate the confined portions of the rubber stock, opposed sealing members movable into operative relation, within said opening, to join the inflated portions of rubber stock, in endless zones, and a shearing element movable into the opening to sever the inflated body.

14. In a device of the class described, a spacer plate having an opening therein, conveyors on either side of the spacer plate adapted to carry sheets of rubber into positions overlapping said opening, means for clamping endless zones in the rubber stock, against opposite sides of the spacer plate, about said opening, injecting means for introducing an expanding medium into said opening to inflate the confined portions of the rubber stock, opposed sealing members movable into operative relation, within said opening, to join the inflated portions of rubber stock in endless zones and a shearing element movable into the opening to sever the inflated body.

15. In a device of the class described, a horizontal spacer plate having an opening therein, means for clamping endless zones of sheet rubber stock against opposite sides of the spacer plate, about said opening, means for introducing an expanding medium into said opening to inflate the confined portions of rubber stock, an upper reciprocable sealing member and a lower reciprocable, tiltable sealing member, said members being movable vertically into co-operative relation, within said opening, to join the inflated portions of rubber stock in endless zones, yielding abutments carried by said sealing members to prevent the stretching of given regions of the confined rubber stock during the process of inflation, a shearing element for severing the inflated body from the rubber stock, said lower sealing member comprising a cage to receive the severed body, a latch to hold the lower abutment against retraction, and means for tripping said latch, when the lower sealing member is tilted, whereby said lower abutment is caused to eject the inflated body from said sealing member.

16. In a machine of the class described, a spacer plate having an opening therein, means for clamping endless zones of sheet rubber stock against opposite sides of the spacer plate, about said opening, means for introducing an expanding medium into said opening to inflate the confined portions of rubber stock, a sealing member on one side of said plate, a second sealing member on the other side of the plate, said members being movable into co-operative relation, within said opening, to join the inflated portions of rubber stock in endless zones, a shearing element to sever the inflated body from the rubber stock, one of said sealing members comprising a cage to receive and deliver the severed body from the machine.

17. In a machine of the class described, a horizontal spacer plate having an opening therein, means for clamping endless zones of sheet rubber stock against opposite sides of the spacer plate, about said opening, means for introducing an expanding medium into said opening to inflate the confined portions of rubber stock, an upper reciprocable sealing member and a lower reciprocable, tilting sealing member, said members being movable vertically into co-operative relation, within said opening, to join the inflated portions of rubber stock in endless zones, a shearing element to sever the inflated body from the rubber stock, said lower sealing member comprising a cage to receive the severed body and serving, when tilted to eject the inflated body from the machine.

18. In a device of the class described, a spacer plate having an opening therein, conveyors on either side of the spacer plate adapted to carry sheets of rubber stock, step by step, into positions overlapping said opening, means for clamping endless zones in the rubber stock against opposite sides of the spacer plate, about said opening, injecting means for introducing an expanding medium into said opening to inflate the confined portions of the rubber stock, opposed sealing members movable into operative relation, within the opening, to join the inflated portions of rubber stock in endless zones, a shearing element movable into said opening to sever the inflated body from the rubber stock, a common source of power to drive said conveyors, clamping means, sealing members and shearing element, the same being co-ordinated in operation so that the clamping means, sealing members and shearing element function, in the order named, during each dwell of the conveyors.

19. In a device of the class described, a spacer plate having an opening therein, conveyors on either side of the spacer plate adapted to carry sheets of rubber, step by step, into positions overlapping said opening, means for clamping endless zones in the rubber stock, against opposite sides of the spacer plate, about said opening, injecting means for introducing an expanding medium into said opening to inflate the confined portions of the rubber stock, opposed sealing members movable into operative relation within the opening to join the inflated portions of rubber stock in endless zones, a shearing element co-operating with said sealing members and movable into said opening to sever the inflated body from the rubber stock, means for driving said conveyors, clamping means, sealing members and shearing element, the same being co-ordinated in operation so that the clamping means, sealing members and shearing element function, in the order named, during each dwell of the conveyors.

In testimony whereof, I have signed my name to this specification.

FRANK W. SKINNER.